US010769044B2

(12) United States Patent
Lim et al.

(10) Patent No.: US 10,769,044 B2
(45) Date of Patent: Sep. 8, 2020

(54) STORAGE DEVICE WITH A DISPLAY DEVICE FOR INDICATING A STATE

(71) Applicant: SAMSUNG ELECTRONICS CO., LTD., Suwon-si (KR)

(72) Inventors: Gwangman Lim, Seoul (KR); Eun-Jin Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 15/848,793

(22) Filed: Dec. 20, 2017

(65) Prior Publication Data

US 2018/0239684 A1 Aug. 23, 2018

(30) Foreign Application Priority Data

Feb. 17, 2017 (KR) .................. 10-2017-0021873

(51) Int. Cl.
*G06F 11/00* (2006.01)
*G06F 11/32* (2006.01)
*G06F 11/30* (2006.01)

(52) U.S. Cl.
CPC ........ *G06F 11/328* (2013.01); *G06F 11/3034* (2013.01); *G06F 11/3044* (2013.01); *G06F 11/325* (2013.01)

(58) Field of Classification Search
CPC .............. G06F 11/328; G06F 11/3044; G06F 11/3037; G06F 11/325; G06F 11/324
See application file for complete search history.

(56) References Cited

U.S. PATENT DOCUMENTS

| 5,878,201 | A | * | 3/1999 | Onishi | .................. | G06F 11/006 |
| | | | | | | 714/6.12 |
| 6,608,564 | B2 | | 8/2003 | Post et al. | | |
| 6,867,701 | B2 | | 3/2005 | Lawrence et al. | | |
| 6,924,780 | B1 | * | 8/2005 | Horst | ....................... | G09G 3/32 |
| | | | | | | 345/55 |
| 7,233,877 | B2 | | 6/2007 | King et al. | | |

(Continued)

OTHER PUBLICATIONS

IBM. "Node canister LEDs." Oct. 2014. retrieved from "https://www.ibm.com/support/knowledgecenter/ST3FR7/com.ibm.storwize.v7000.641.doc/tbrd_canstatled_1916bx.html." (Year: 2014).*

(Continued)

Primary Examiner — Philip Guyton
(74) Attorney, Agent, or Firm — Sughrue Mion, PLLC

(57) ABSTRACT

A storage device and a method for indicating a state of a storage device are provided. The storage device may include nonvolatile memory devices, a controller that controls the nonvolatile memory devices, a display device, and a display controller that controls the display device. The display controller may control the display device to display different colors respectively corresponding to states of the storage device. The states may include an access state in which the controller accesses the nonvolatile memory devices according to a request from an external host device, a standby state in which the controller is ready to perform the request from the external host device, a device fail state in which the controller and the nonvolatile memory devices cannot operate, and a replacement state in which the controller and the nonvolatile memory devices are selected for replacement.

16 Claims, 18 Drawing Sheets

(56) References Cited

U.S. PATENT DOCUMENTS

| | | |
|---|---|---|
| 7,370,149 B2 | 5/2008 | Suzuki et al. |
| 7,441,083 B2 | 10/2008 | Suzuki et al. |
| 7,928,858 B2 | 4/2011 | Jones et al. |
| 8,060,893 B2* | 11/2011 | Georgis ............. G11B 23/0303 |
| | | 720/600 |
| 9,298,581 B2 | 3/2016 | Adams |
| 9,336,833 B2* | 5/2016 | Walsh .................... G11B 33/10 |
| 2002/0010835 A1 | 1/2002 | Post et al. |
| 2003/0197619 A1 | 10/2003 | Lawrence et al. |
| 2005/0049825 A1 | 3/2005 | King et al. |
| 2005/0182901 A1 | 8/2005 | Suzuki et al. |
| 2005/0210207 A1* | 9/2005 | Sekine ................. G06F 11/325 |
| | | 711/154 |
| 2006/0095667 A1 | 5/2006 | Suzuki et al. |
| 2009/0135698 A1* | 5/2009 | Fujibayashi .......... G06F 11/325 |
| | | 369/53.42 |
| 2009/0147646 A1 | 6/2009 | Jones et al. |
| 2011/0239056 A1 | 9/2011 | Adams |
| 2015/0363253 A1 | 12/2015 | Davis et al. |
| 2016/0140011 A1* | 5/2016 | Yeung ................... G06F 11/325 |
| | | 710/10 |
| 2016/0179734 A1 | 6/2016 | Shih |

OTHER PUBLICATIONS

IBM. "Expansion canister LEDs." Oct. 2014. retrieved from "https://www.ibm.com/support/knowledgecenter/ST3FR7/com.ibm.storwize.v7000.641.doc/tbrd_expcanstatled_1921bc.html." (Year: 2014).*

IBM. "Fibre channel ports and indicators." Oct. 2014. retrieved from "https://www.ibm.com/support/knowledgecenter/ST3FR7/com.ibm.storwize.v7000.641.doc/tbrd_fcports_1912vc.html." (Year: 2014).*

IBM. "Node canister SAS ports and indicators." Oct. 2014. retrieved from "https://www.ibm.com/support/knowledgecenter/ST3FR7/com.ibm.storewize.v7000.641.doc/tbrd_sasports_1915tr.html." (Year: 2014).*

* cited by examiner

STORAGE DEVICE WITH A DISPLAY DEVICE FOR INDICATING A STATE

CROSS-REFERENCE TO RELATED APPLICATION

This application claims priority from Korean Patent Application No. 10-2017-0021873, filed on Feb. 17, 2017, the disclosures of which are incorporated herein in their entireties by reference.

BACKGROUND

1. Field

The inventive concept relates to semiconductor devices, and more particularly, to a storage device.

2. Description of the Related Art

A storage device stores data under the control of a host device such as a computer, a smart phone, a tablet computing device, etc. The storage device includes a device storing data in a magnetic disk such as a hard disk drive (HDD) and a device storing data in a semiconductor memory, in particular, in a nonvolatile memory, such as a memory card.

The nonvolatile memory includes a read-only memory (ROM), a programmable ROM (PROM), an electrically programmable ROM (EPROM), an electrically erasable and programmable ROM (EEPROM), a flash memory, a phase change random access memory (PRAM), a magnetic RAM (MRAM), a resistive RAM (RRAM), a ferroelectric RAM (FRAM), etc.

Application of the storage device including the nonvolatile memory spans from a personal computer to an enterprise computer such as a data server. As the application of the storage device continues to expand, a function and a form factor of the storage device needed are being diversified.

SUMMARY

Example embodiments provide a storage device and a method for a display device that indicates a state of the storage device. According to an aspect of an exemplary embodiment, a storage device may include nonvolatile memory devices, a controller that controls the nonvolatile memory devices, a display device, and a display controller that controls the display device. The display controller may control the display device to display different colors respectively corresponding to states of the storage device, the states comprising an access state in which the controller accesses the nonvolatile memory devices according to a request from an external host device, a standby state in which the controller is ready to perform the request from the external host device, a device fail state in which the controller and the nonvolatile memory devices cannot operate, and a replacement state in which the controller and the nonvolatile memory devices are selected for replacement.

According to an aspect of an exemplary embodiment, a storage device may include nonvolatile memory devices, a controller that controls the nonvolatile memory devices, a detection circuit that detects whether the nonvolatile memory devices and the controller are selected as a target of replacement, a display device, and a display controller that controls the display device. The display controller may change a color of the display device when a signal indicating that the nonvolatile memory devices and the controller are selected as a target of replacement is received from the detection circuit.

According to an aspect of an exemplary embodiment, a storage device may include nonvolatile memory devices, a controller that controls the nonvolatile memory devices, a detection circuit that activates a signal in response to one of a physical force being applied and an electrical connection with an external device being changed, a display device, and a display controller that controls the display device. The display controller may change a color of the display device in response to the nonvolatile memory devices and the controller being in a device fail state and the signal being activated.

BRIEF DESCRIPTION OF THE FIGURES

The above and/or other aspects will become apparent and more readily appreciated from the following description of exemplary embodiments, taken in conjunction with the accompanying drawings, in which.

DETAILED DESCRIPTION OF THE EMBODIMENTS

Figure 1:
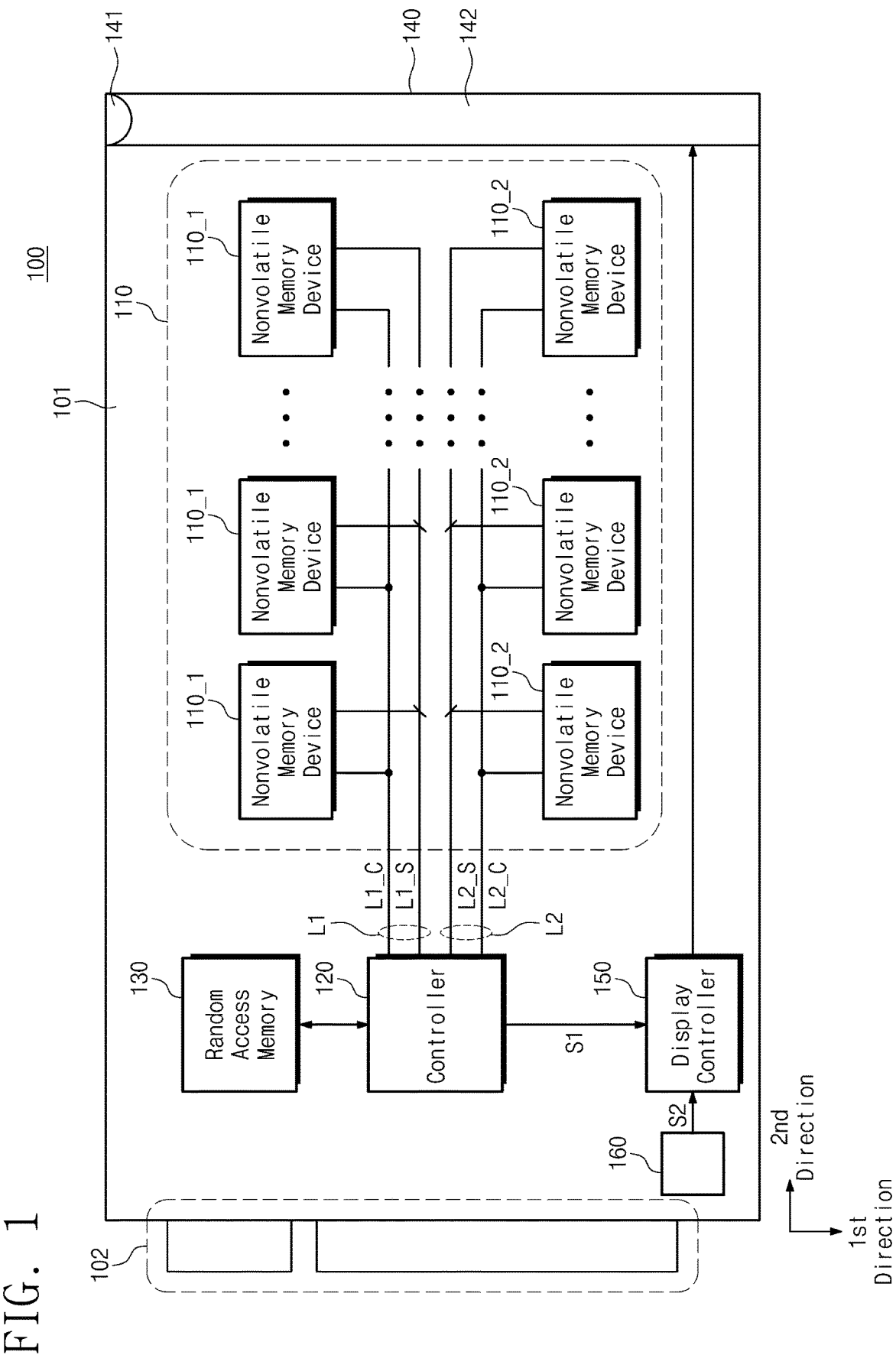
FIG. 1 is a block diagram illustrating a storage device according to an exemplary embodiment.

References will now be made in detail to exemplary embodiments, with reference to the accompanying drawings. Concepts described in this disclosure may, however, be embodied in many different forms and should not be construed as limited to the exemplary embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

FIG. 1 is a block diagram illustrating a storage device 100 according to an exemplary embodiment. Referring to FIG. 1, the storage device 100 includes a printed circuit board 101, a connector 102, a nonvolatile storage unit 110, a controller 120, a random access memory 130, a display device 140, a display controller 150, and a detection circuit 160.

The printed circuit board 101 may include an insulation material such as plastic. The printed circuit board 101 may have a structure in which a plurality of insulation layers is stacked. Interconnection lines may be disposed on a top surface and/or a bottom surface of the printed circuit board and/or on at least one of surfaces between the insulation layers. The interconnection lines may connect the connector 102, the nonvolatile storage unit 110, the controller 120, the random access memory 130, the display device 140, the display controller 150, and the detection circuit 160 to one another. For simplicity, the overall interconnection line arrangement is not illustrated in detail. It is conceptually illustrated that a part of the interconnection lines may include first lines L1 and second lines L2.

The connector 102 may provide a connection between the storage device 100 and an external host device, such as a personal computer (PC). The connector 102 may include the same material as the printed circuit board 101 and the printed circuit board 101 may be formed to have a protrusion shape. Interconnection lines may be disposed on at least one of a top surface and a bottom surface of the connector 102. The interconnection lines may provide an electrical connection between the connector 102 of the storage device 100 and a connector of the external host device.

The printed circuit board 101 and the connector 102 may have a structure and a form factor according to a peripheral component interconnect express (PCIe) M.2 standard.

The nonvolatile storage unit 110 may include first nonvolatile memory devices 110_1 and second nonvolatile memory devices 110_2. The first nonvolatile memory devices 110_1 are connected to the controller 120 through first lines L1. The first lines L1 include first common lines L1_C and first individual lines L1_S. The first nonvolatile memory devices 110_1 may share the first common lines L1_C. For example, the first common lines L1_C may include input/output lines (DQ) through which a command and an address are transmitted, a write enable signal (/WE), a read enable signal (/RE), a data strobe signal (DQS), a command latch enable signal (CLE), an address latch enable signal (ALE), etc. Each of the first nonvolatile memory devices 110_1 may be connected to the controller 120 through special-purpose first individual lines L1_S. The first individual lines L1_S may include a chip enable signal (/CE), a ready and busy signal (RnB), etc.

The second nonvolatile memory devices 110_2 are connected to the controller 120 through second lines L2. The second lines L2 include second common lines L2_C and second individual lines L2_S. A description of the second common lines L2_C and the second individual lines L2_S is the same as that of the first common lines L1_C and the first individual lines L1_S and thus the description of overlapping contents is omitted.

The first nonvolatile memory devices 110_1 may form a first channel that communicates with the controller 120 through the first lines L1. One of the first nonvolatile memory devices 110_1 is selected and the selected nonvolatile memory device can communicate with the controller 120. While the selected nonvolatile memory device communicates with the controller 120, other nonvolatile memory devices may stand by. The first nonvolatile memory devices 110_1, which are alternately accessed by the controller 120, may be referred to as "ways."

The second nonvolatile memory devices 110_2 may form a second channel that communicates with the controller 120 through the second lines L2. The second channel may be controlled by the controller 120 independently of the first channel. Although FIG. 1 shows the nonvolatile storage unit 110 as having only two channels, the nonvolatile storage unit 110 may have three or more channels, each with its own nonvolatile memory devices, common lines, and individual lines connected to and controlled by the controller 120.

The controller 120 may receive a write request, a read request, or an erase request from the external host device through the connector 102. The controller 120 may control the nonvolatile storage unit 110 and the random access memory 130 according to a request transmitted from the external host device or a schedule made by an internal background operation. The controller 120 may store write data transmitted from the external host device in the random access memory 130. The controller 120 may write the write data stored in the random access memory 130 in the nonvolatile storage unit 110.

The controller 120 may read data from the nonvolatile storage unit 110 and may store the read data in the random access memory 130. The controller 120 may rewrite the data stored in the random access memory 130 in a different location (e.g., a storage space with a different address) of the nonvolatile storage unit 110 or may output the data to the external host device. The controller 120 may erase a selected storage space of the nonvolatile storage unit 110.

The controller 120 may load various meta data needed to manage the storage device 100 into the random access memory 130 or an internal memory (e.g., memory located inside the controller 120) and may manage the meta data. The controller 120 may load mapping information between a logical address of the external host device and a physical address of the nonvolatile storage unit 110 into the random access memory 130 or an internal memory and may manage the mapping information.

The controller 120 may monitor a state of the storage device 100 and may output information indicating a state as a first signal S1. The first signal S1 may be transmitted to the display controller 150. For example, the state may include a standby state indicating that the storage device 100 normally operates and an access is not being performed, an access state indicating that the storage device 100 normally operates and an access is performed according to a request of the external host device or a schedule of a background operation, and a fail state indicating that the storage device 100 cannot normally operate for the reason such as a device failure or a device hang.

The random access memory 130 may include a dynamic random access memory (DRAM), a static RAM (SRAM), a phase-change RAM (PRAM), a ferroelectric RAM (FRAM), a magnetic RAM (MRAM), a resistive RAM (RRAM), etc. The random access memory 130 may be used as an operation memory of the controller 120. The random access memory 130 may be used as a buffer memory when the controller 120 communicates with the external host device.

In the storage device 100, the random access memory 130 may be omitted. When the random access memory 130 is omitted, various functions described with reference to the random access memory 130 may be performed by an internal memory of the controller 120.

The display device 140 may display a color according to a control of the display controller 150. The display device 140 may be disposed on a side exposed to a user when the storage device 100 is installed on the external host device. For example, the display device 140 may be disposed at an opposite edge from the connector 102 along a second direction in the printed circuit board 101.

The display device 140 may include a light source 141 and a reflector 142. The light source 141 may be disposed on the reflector 142. The light source 141 may be disposed on one side edge along a first direction on the reflector 142. The light source 141 may include light emitting diodes that can display various colors. The reflector 142 may include a material that can reflect light radiating from the light source 141. For example, the reflector 142 may include acrylic, plastic, metal, etc.

The display controller 150 may receive the first signal S1 from the controller 120 and may receive a second signal S2 from the detection circuit 160. The display controller 150 may adjust a color of the light source 141 of the display device 140 in response to the first signal S1 and/or the second signal S2. Although in FIG. 1, it is illustrated that the display controller 150 is disposed outside the controller 120, the display controller 150 may be disposed inside the controller 120.

The detection circuit 160 may detect whether the storage device 100 is selected as a target of replacement. The detection circuit may be a mechanical detection circuit that is designed to detect a mechanical movement. Alternatively, the detection circuit may be an electrical detection circuit that is designed to detect an electrical change. For example, the detection circuit 160 may detect whether the storage device 100 is selected as a target of replacement (e.g., the storage device 100 is to be detached from the external host device and/or replaced by a new storage device) by detecting that a location of the storage device 100 is changed by an external physical force or by detecting that an electrical connection between the storage device 100 and the external host device has changed. If the storage device 100 is selected as a target of replacement, the detection circuit 160 may activate (e.g., transmit) the second signal S2. If the storage device 100 is not selected as a target of replacement, the detection circuit 160 may deactivate (e.g., stop transmission of) the second signal S2.

Even though a specific location of the detection circuit 160 is illustrated in FIG. 1, this is merely an example. A location of the detection circuit 160 may be different depending on a type, a characteristic, a process, etc. of the storage device 100.

One of more of the first nonvolatile memory devices 110_1, the second nonvolatile memory devices 110_2, the controller 120, the random access memory 130, and the display controller 150 may be embodied by at least one package and may be disposed on a top surface or a bottom surface of the printed circuit board 101. One package may include a homogeneous block or homogeneous blocks (e.g., the nonvolatile memory devices (110_1, 110_2), the controller 120, the random access memory 130, or the display controller 150). One package may be embodied by heterogeneous blocks (e.g., combination of two or more different blocks among the nonvolatile memory devices (110_1, 110_2), the controller 120, the random access memory 130, or the display controller 150).

Figure 2:
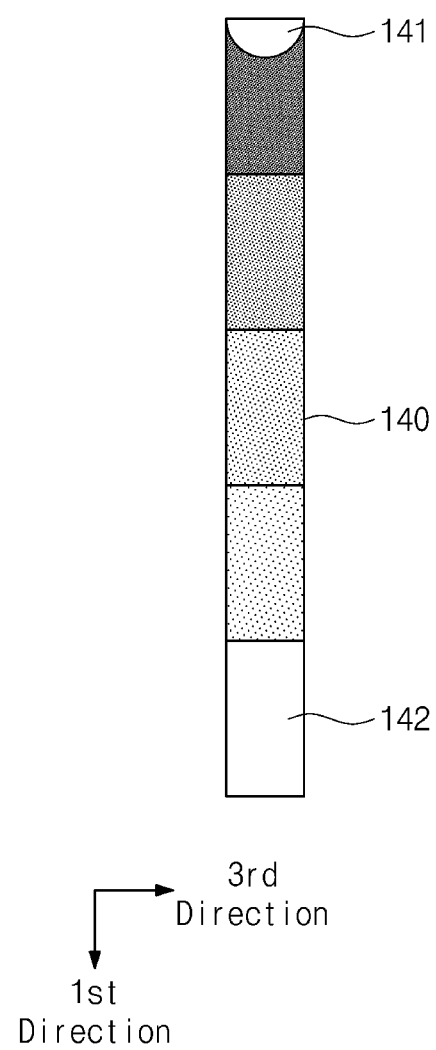
FIG. 2 illustrates an example where a display device displays a color.

FIG. 2 illustrates an example where a display device 140 displays a color. An example of taking a view of the storage device 100 along an opposite direction to the second direction is illustrated in FIG. 2. Referring to FIG. 2, the light source 141 may be disposed on one side edge of the reflector 142. For example, the light source 141 may be disposed on an edge of an opposite direction to the first direction. The reflector 142 may have a quadrilateral shape having a first side along the first direction and a second side shorter than the first side along a third direction. However, a shape of the reflector 142 is not limited thereto.

Since more intense light from the light source 141 is introduced into a part of the reflector 142 close to the light source 141, the part of the reflector 142 close to the light source 141 may reflect more intense light. Since less intense light from the light source 141 is introduced into a part of the reflector 142 far away from the light source 141, the part of the reflector 142 far away from the light source 141 may reflect less intense light. Thus, as illustrated in FIG. 2, the intensity of light reflected by the reflector 142 may be represented in gradations where darker shades represent more intense light.

A plurality of storage devices is usually installed in a tray of a server. As a semiconductor technology is developed, a size of the storage device 100 is reduced. Thus, it becomes difficult to identify states of storage devices installed in the tray by only a light source. Light irradiated from the light source 141 may be reflected by the reflector 142. Information indicating a state of the storage device 100 may be expressed by the combination of light of the light source 141 and light reflected by the reflector 142. Thus, it becomes easier to identify a state of the storage device 100. It becomes also easier to identify the storage device 100 of a specific state (e.g., a fail state) and to select it for the replacement.

Figure 3:
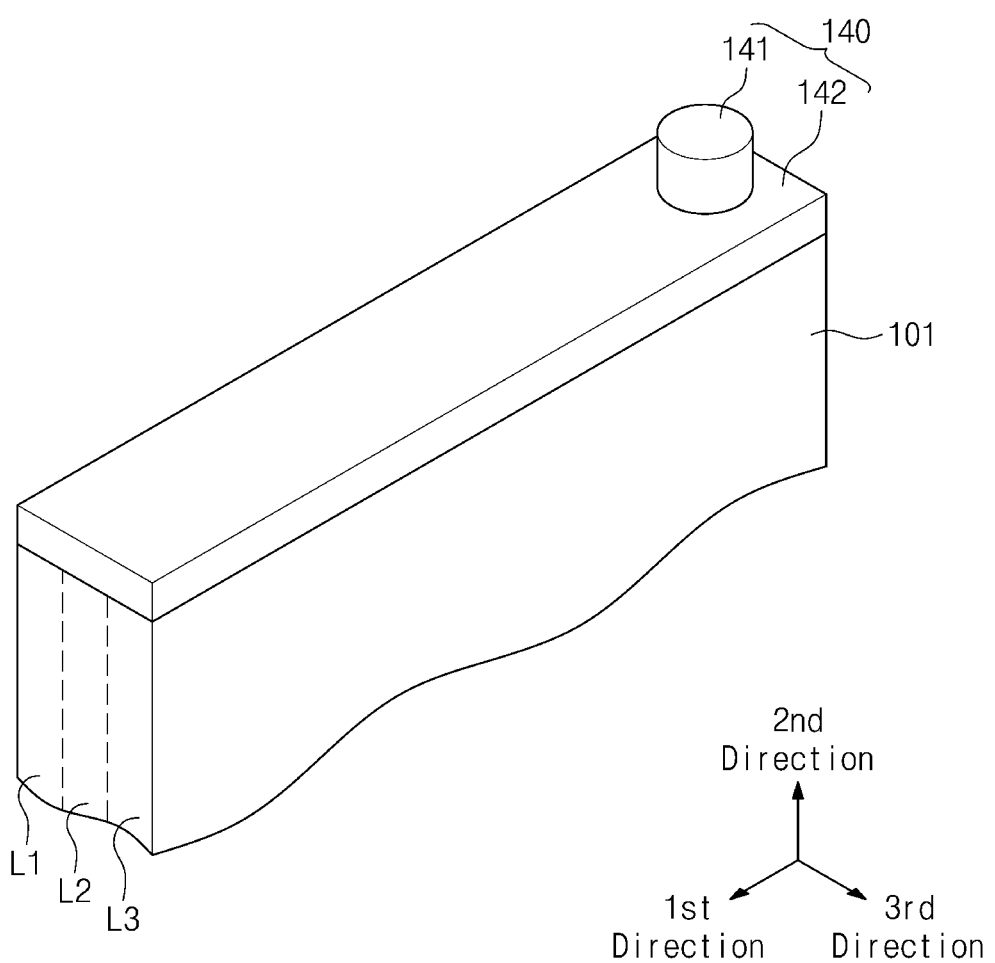
FIG. 3 is a perspective view illustrating a display device and a part of a printed circuit board adjacent to the display device.

FIG. 3 is a perspective view illustrating a display device and a part of a printed circuit board adjacent to the display device. Referring to FIG. 3, the display device 140 and the printed circuit board 101 are illustrated along first, second, and third directions.

The reflector 142 may have a shape of plane perpendicular to the printed circuit board 101. The printed circuit board 101 may combine at one of a first position L1 which is an edge of the reflector 142 of an opposite direction to the third direction, a third position L3 which is an edge of the reflector 142 of the third direction, and a second position L2 which is not an edge.

Figure 4:
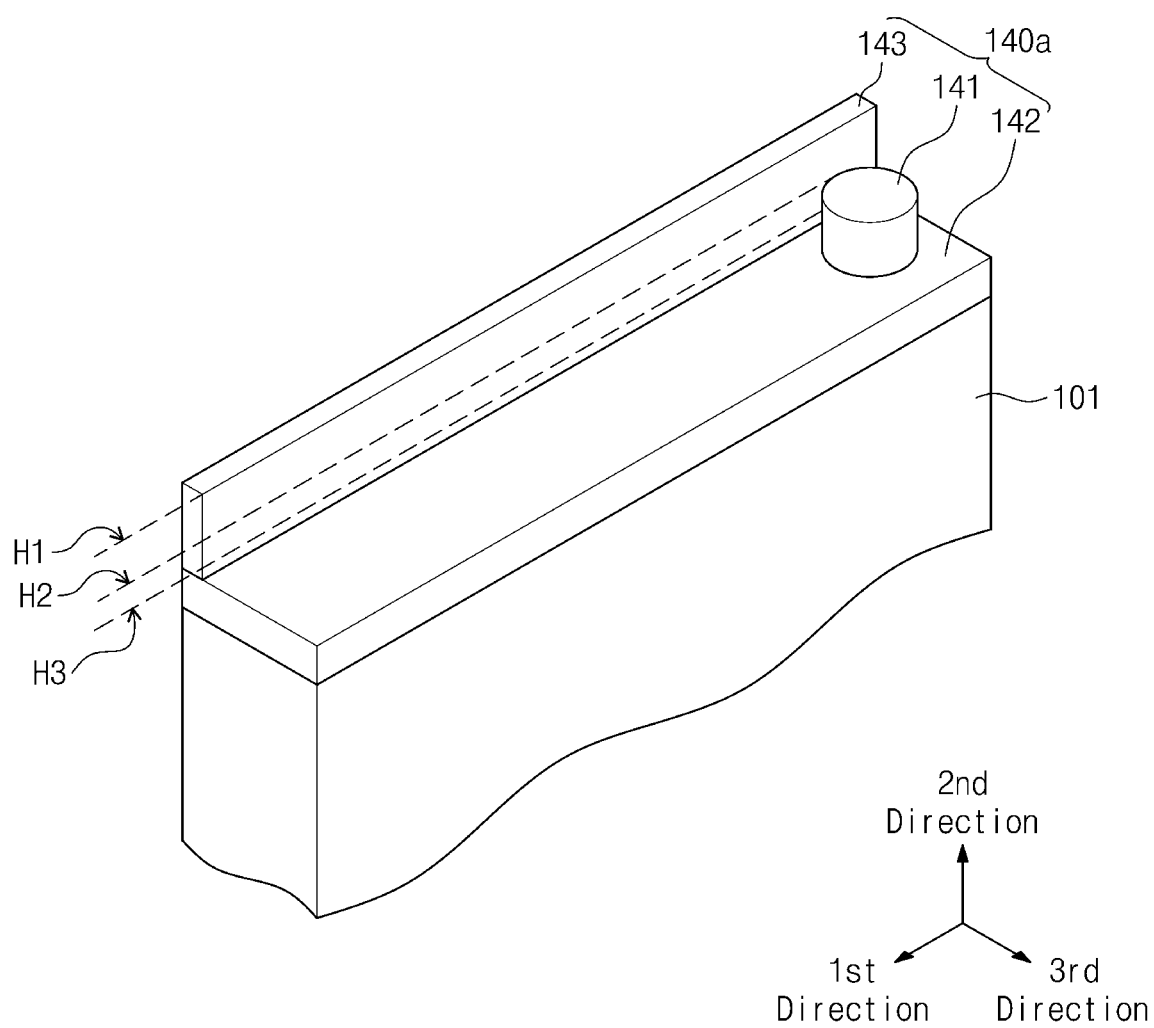
FIG. 4 illustrates an example where a sidewall is provided to a display device of FIG. 3.

FIG. 4 illustrates an example where a sidewall 143 is provided to the display device of FIG. 3. Referring to FIG. 4, in a display device 140a, a sidewall 143 may be provided at an edge of the reflector 142 of an opposite direction to the third direction. The sidewall 143 may include material that reflects light irradiated from the light source 141. The sidewall 143 may include material which is the same as or different from the reflector 142.

A height of the sidewall 143 in the second direction may be one of a second height H2 which is the same as a height of the light source 141 in the second direction, a first height H1 higher than the height of the light source 141, and a third height H3 lower than the height of the light source 141. In FIG. 4, even though it is illustrated that the sidewall 143 is provided at one edge of the reflector 142, the sidewall 143 may be provided at two or more edges of the reflector 142.

Figure 5:
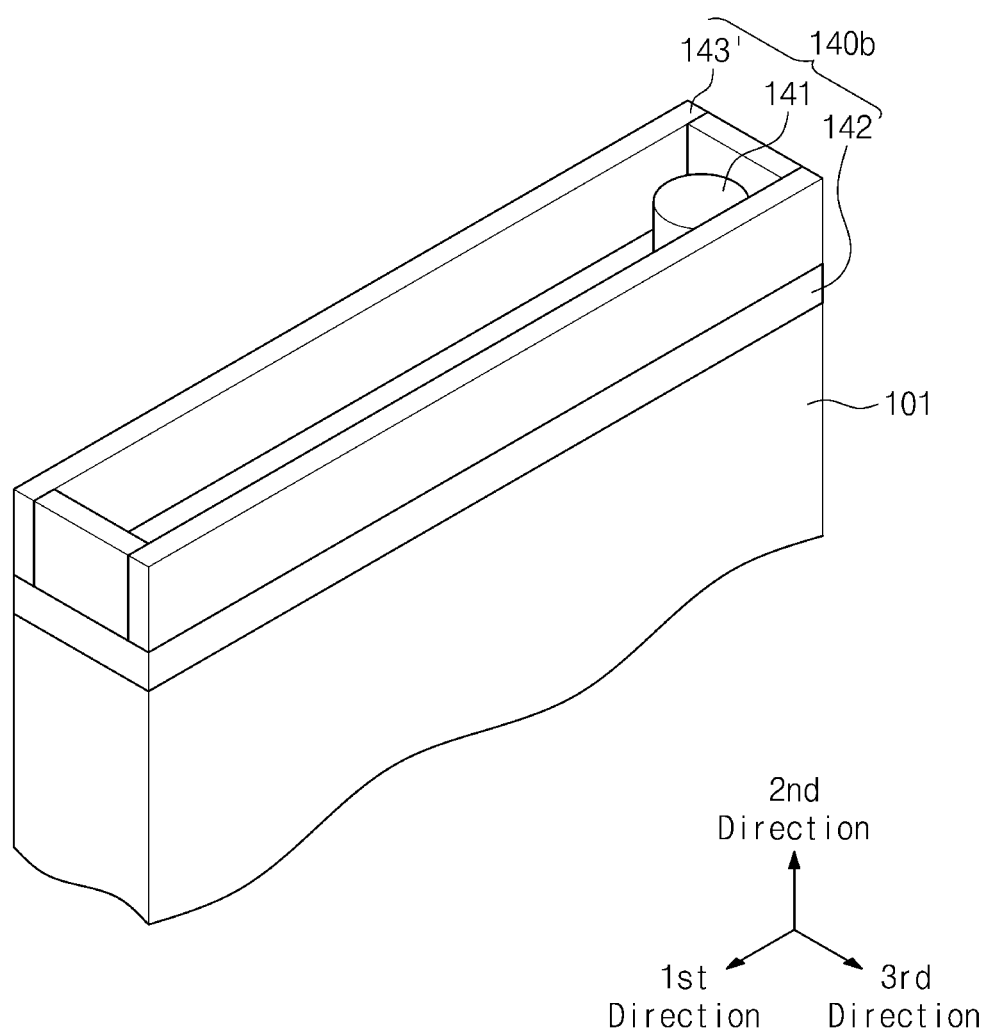
FIG. 5 illustrates an example where four sidewalls are provided to a display device of FIG. 4.

FIG. 5 illustrates an example where four sidewalls 143 are provided to the display device 140a of FIG. 4. Referring to FIG. 5, in a display device 140b, sidewalls 143' may be provided at four edges of the reflector 142. The sidewalls 143' may have the same height or different heights with each other along the second direction. The sidewalls 143' may include the same materials or different materials. The sidewalls 143' may reflect light irradiated from the light source 141.

Figure 6:
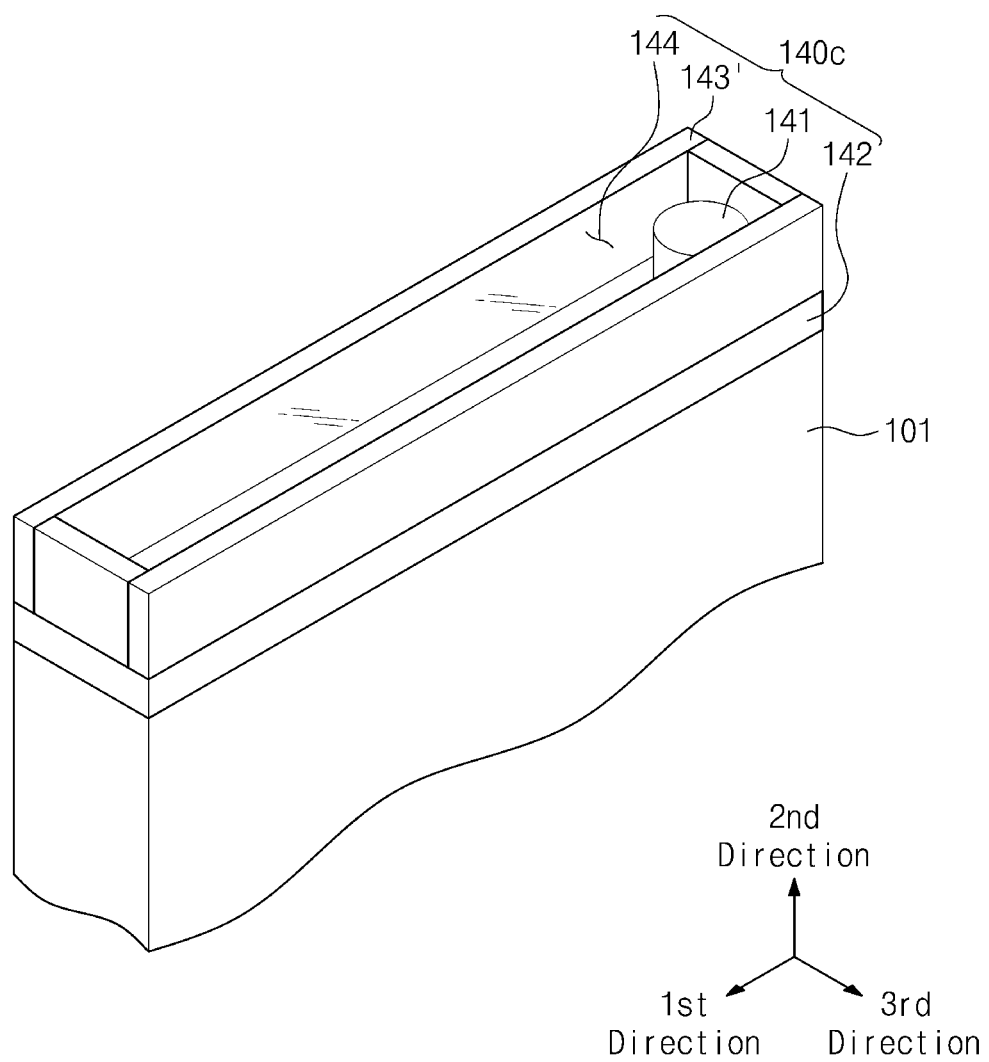
FIG. 6 illustrates an example where a transparent cap is provided to a display device of FIG. 5.

FIG. 6 illustrates an example where a transparent cover 144 is provided to the display device 140b of FIG. 5. Referring to FIG. 6, in a display device 140c, the transparent cover 144 may be provided on the sidewalls 143' or be provided in parallel with a top surface of the sidewalls 143'. The light irradiated from the light source 141 and light reflected from the reflector 142 or the sidewalls 143' may travel through the transparent cover 144. The transparent cap 144 may include a material such as acrylic, plastic, etc.

Figure 7:
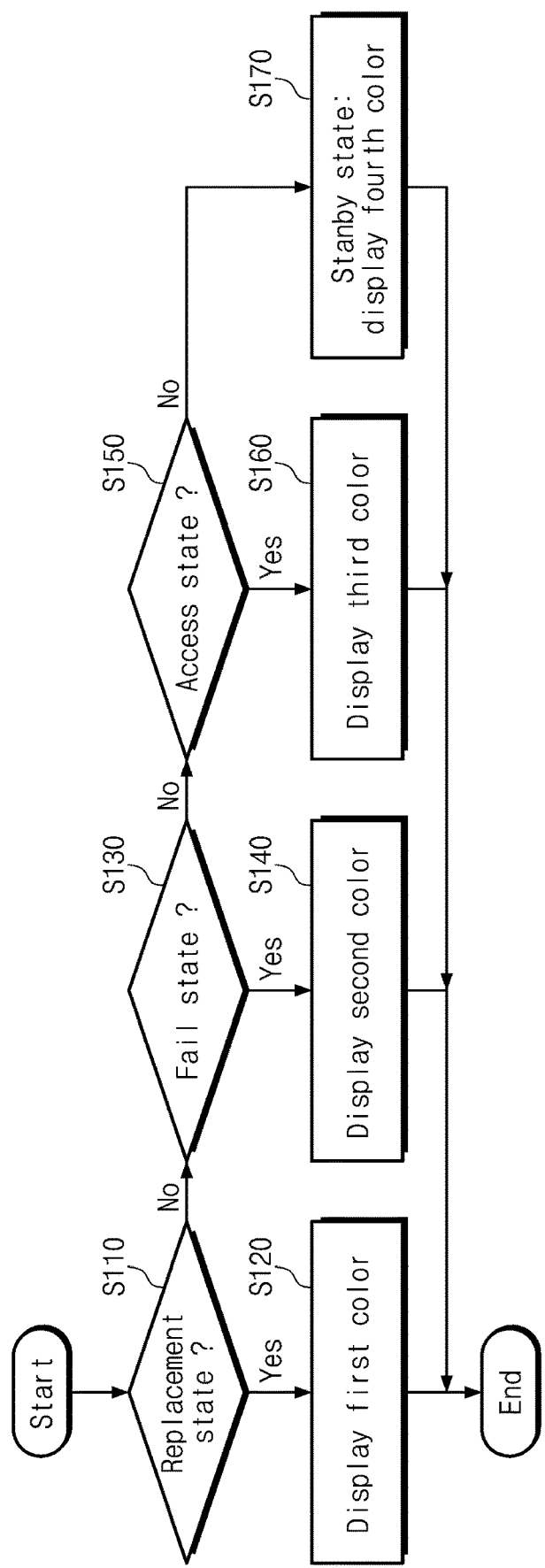
FIG. 7 is a flowchart illustrating a method of operating a storage device according to example embodiments of the inventive concept.

FIG. 7 is a flowchart illustrating a method of operating a storage device according to an exemplary embodiment. Referring to FIGS. 1 and 7, the display controller 150 may determine whether the storage device 100 is in a replacement state. The display controller 150 may determine a replacement state based on the second signal S2 or the first and second signals S1 and S2. The replacement state may indicate a state where the storage device 100 is selected for replacement. In the replacement state, a power supply to the storage device 100 may continue. If the storage device 100 is in the replacement state, in an operation S120, the display controller 150 may display a first color through the storage device 140.

If the storage device 100 is not in the replacement state, in an operation S130, the display controller 150 may determine whether the storage device 100 is in a fail state. For example, the display controller 150 may determine the fail state based on the first signal S1. The fail state indicates a state where the storage device 100 cannot normally operate (e.g., malfunctioning or operating outside predetermined parameters) due to an error such as a device failure, a device hang, etc. If the storage device 100 is in the fail state, in an operation S104, the display controller 150 may display a second color different from the first color through the display device 140.

If the storage device 100 is not in the replacement state or the fail state, in an operation S150, the display controller 150 determines whether the storage device 100 is in an access state. For example, the display controller 150 may determine the access state based on the first signal S1. The access state indicates a state where the storage device 100 performs a write, read or erase operation (e.g., data access operation) according to a request of an external host device or an internal schedule by a background operation to access the nonvolatile storage unit 110. If the storage device 100 is in the access state, in an operation S160, the display controller 150 may display a third color different from the first and second colors through the display device 140.

If the storage device 100 is not in the replacement state, the fail state, and the access state, the storage device 100 may be in a standby state. For example, the display controller 150 may determine whether the storage device 100 is in the standby state based on the first signal S1. The standby state indicates a state where the storage device 100 does not access the nonvolatile storage unit 110. In an operation S170, the display controller 150 may display a fourth color different from the first through third colors through the display device 140.

Figure 8:
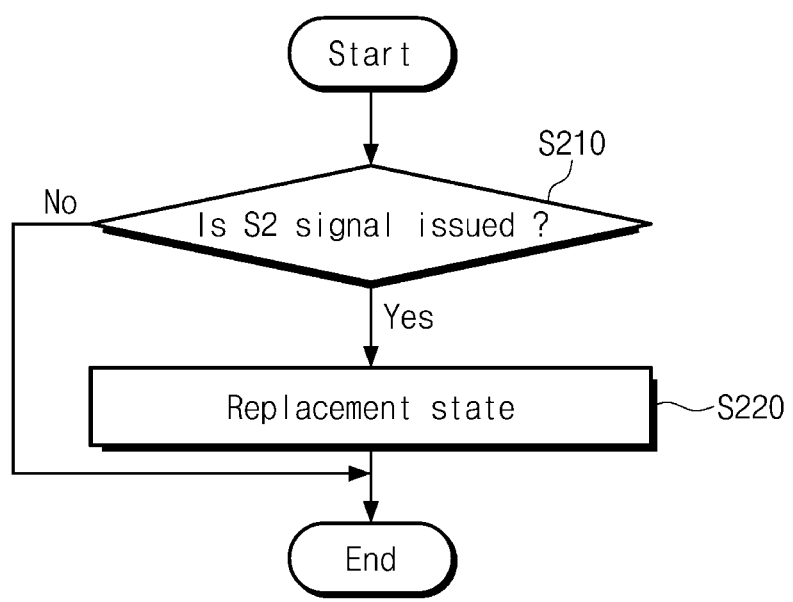
FIG. 8 illustrates an example where a display controller determines a replacement state.

FIG. 8 illustrates an example where a display controller determines a replacement state. Referring to FIGS. 1 and 8, in an operation S210, the display controller 150 determines whether the second signal S2 has been issued (or activated). If the second signal S2 has been issued (or activated), in an operation S220, the display controller 150 may determine that the storage device 100 is in a replacement state regardless of the first signal S1. If the second signal S2 has not issued (or activated), the display controller 150 may not determine that the storage device 100 is in the replacement state regardless.

Figure 9:
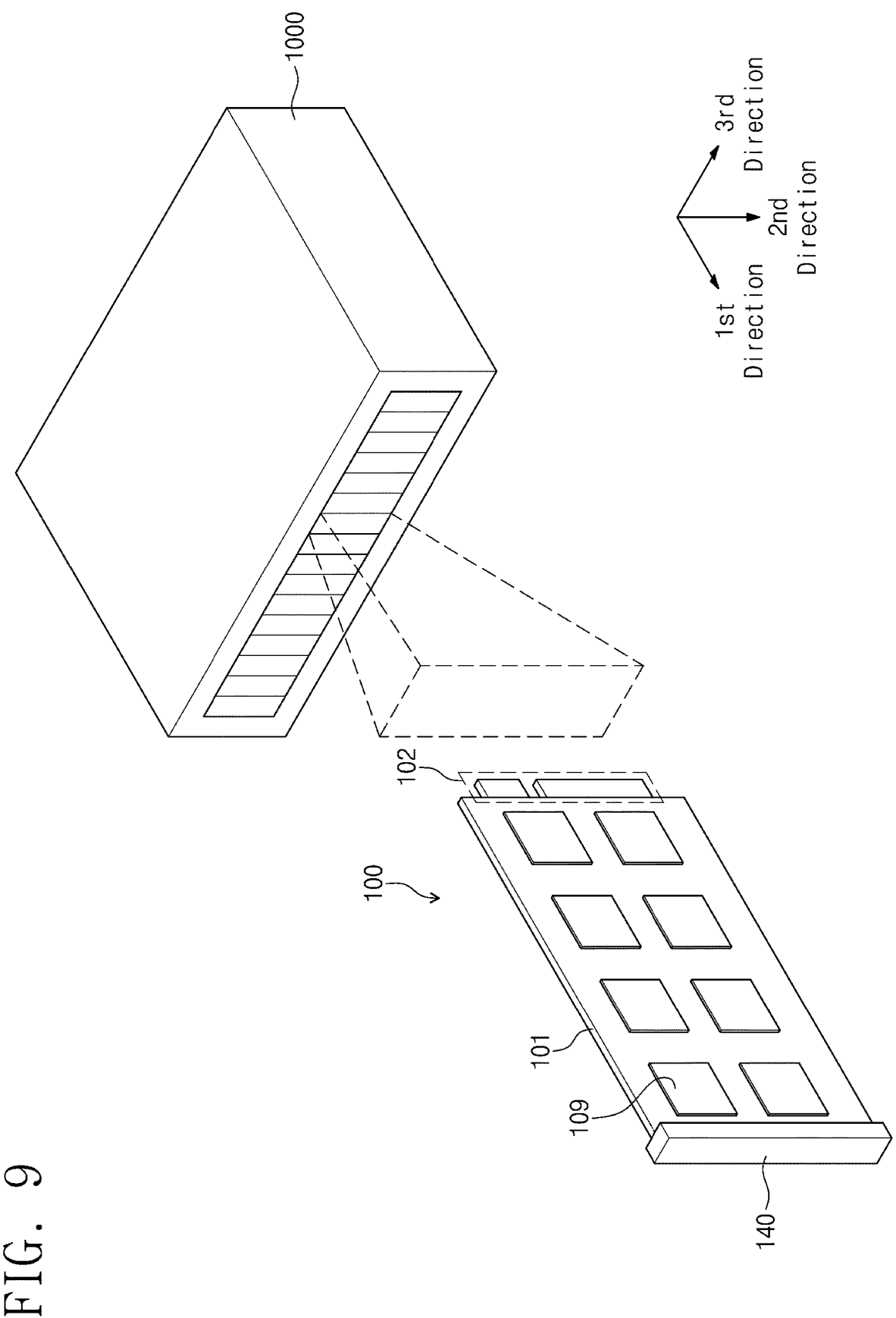
FIG. 9 illustrates an example where a storage device is installed in a tray.

FIG. 9 illustrates an example where a storage device is installed in a tray. Referring to FIGS. 1 and 9, a tray 1000 may include a plurality of slots and each slot may be a space in which one storage device 100 is installed. The storage device 100 may be inserted into one slot. For example, a connector 102 of the storage device 100 may combine with an internal connector of the tray 1000.

It is illustrated that packages 109 adheres to the printed circuit board 101 of the storage device 100. Each of the packages 109 may include at least one of the nonvolatile memory devices (110_1, 110_2), the controller 120, the random access memory 130, and the display controller 150 of FIG. 1. The display device 140 may be disposed at a position that can be viewed by a user when the storage device 100 is inserted into the tray 1000.

To help the storage device 100 be detached from the tray 1000, the tray 1000 may include means like a latch and the storage device 100 may include means like a lever.

Figure 10:
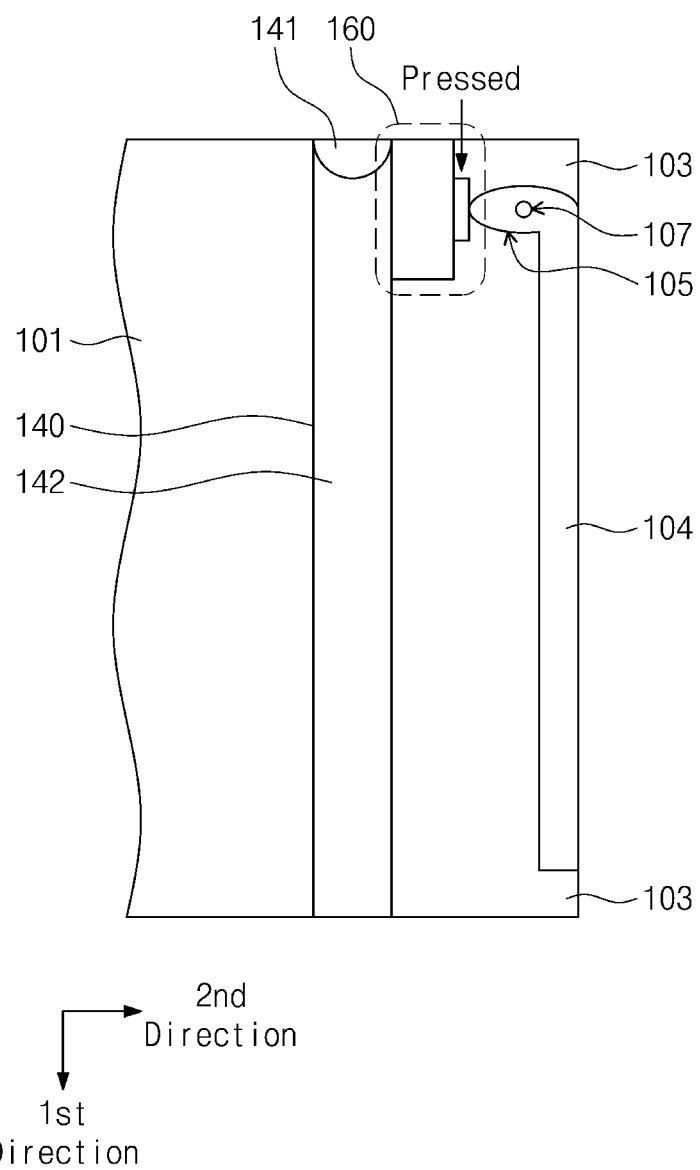
FIG. 10 illustrates an example of a lever and a detection circuit of a storage device.

FIG. 10 illustrates an example of a lever and a detection circuit of a storage device. Referring to FIGS. 1 and 10, the printed circuit board 101, the display device 140, the detection circuit 160, the plate 103, and the lever 104 may be disposed along the second direction.

The plate 103 may include materials which are the same as or different from the printed circuit board 101. The plate 103 may be an extension of the printed circuit board 101. The display device 140 may adhere to a top surface or a bottom surface of the printed circuit board 101. As another example, the plate 103 may be a thing that is combined with the printed circuit board 101 or the display device 140.

The lever 104 may be disposed on a top surface or a bottom surface of the plate 103 and may be installed to be rotatable by a user. The lever 104 may have a protrusion part 105 on a rotation axis 107. The detection circuit 160 may include a switch pressed by the protrusion part 105 of the lever 104. When the lever 104 is closed (e.g. in a vertical position along the edge of the plate 103), the switch of the detection circuit 160 is in a pressed state. In a state where the switch is pressed, the detection circuit 160 may deactivate the second signal S2.

Figure 11:
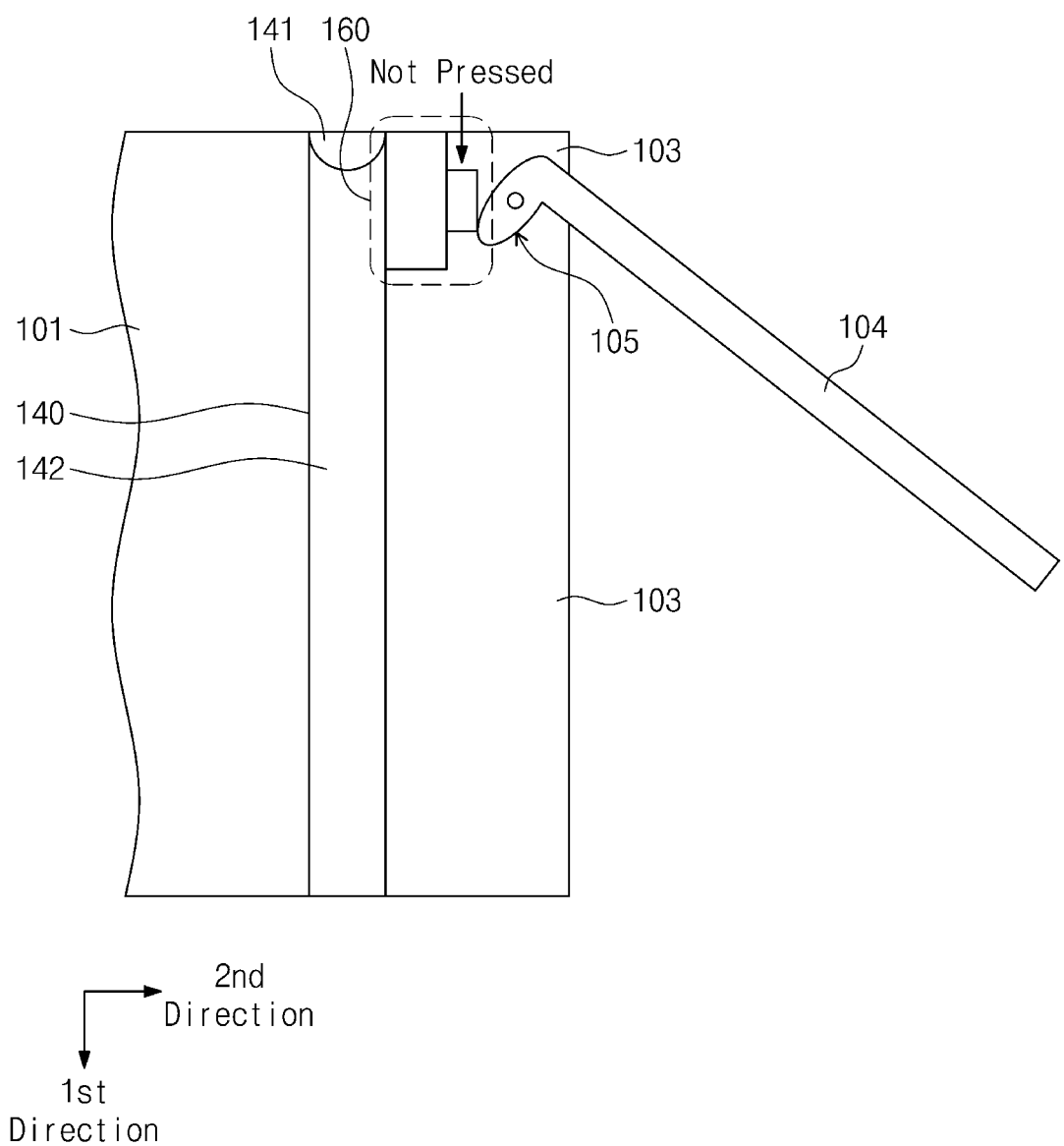
FIG. 11 illustrates an example where a lever is open.

FIG. 11 illustrates an example where a lever is open (e.g., in a rotated position relative to the edge of the plate 103). Referring to FIGS. 1 and 11, the lever 104 can be opened (e.g., pulled) by a physical force applied by a user. For example, when a user detaches the storage device 100 from the tray 1000, the user may open the lever 104. By opening and then pulling the lever 104, the storage device 100 may be more easily detached from the tray 1000.

When the lever 104 is open, the switch of the detection circuit 160 may no longer be pressed by the protrusion part 105 of the lever 104. When the switch is not pressed, the detection circuit 160 may activate (e.g., transmit) the second signal S2.

The detection circuit 160 may identify whether the storage device 100 is in a selected replacement state for the replacement by detecting that the lever 104 has been opened by a physical force applied from the outside. If the replacement state is identified, the display device 140 may notify that the storage device 100 has entered the replacement state by displaying the first color.

It is illustrated that the lever 104 and the detection circuit 160 are located towards the second direction of the display device 140. However, the lever 104 and the detection circuit 160 may be disposed towards an opposite side of the second direction of the display device 140.

Figure 12:
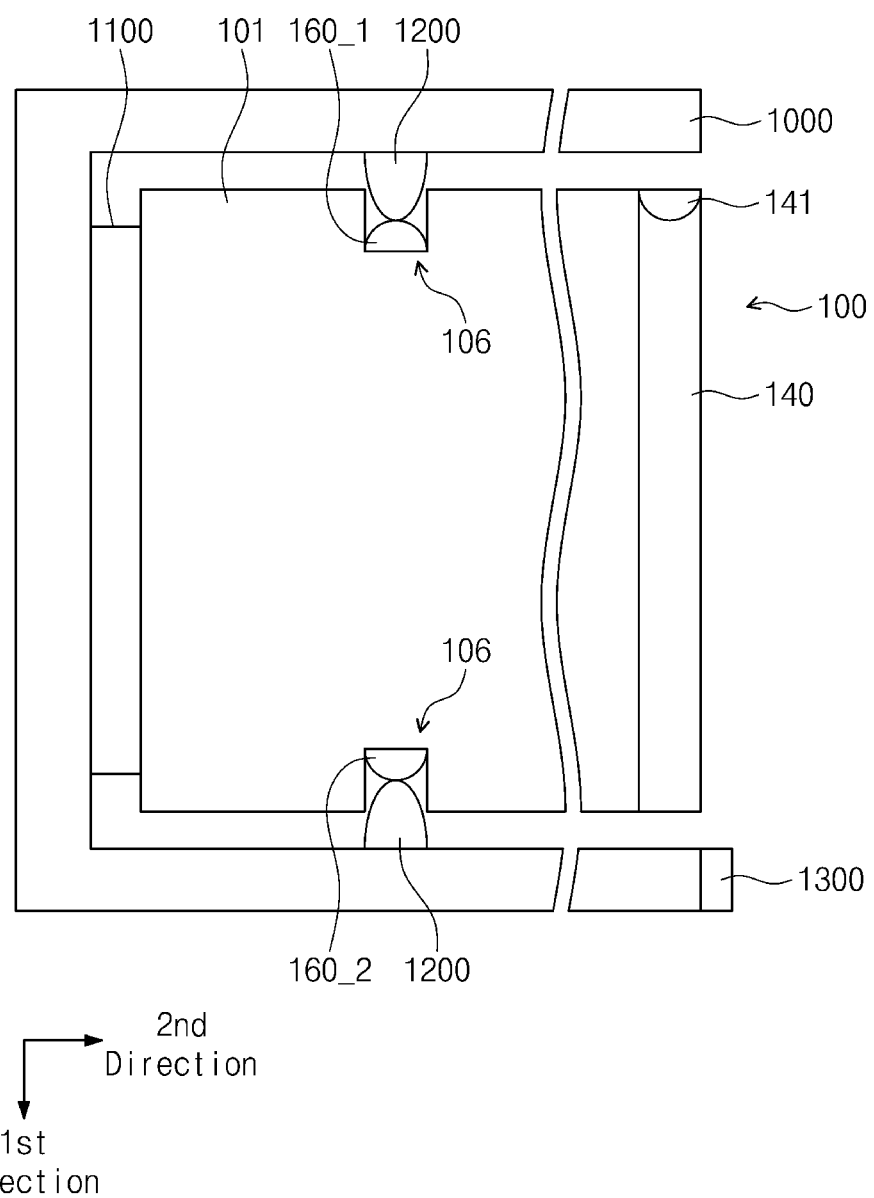
FIG. 12 illustrates an example where a storage device is inserted into a tray.

FIG. 12 illustrates an example where a storage device is inserted into a tray. Referring to FIGS. 1 and 12, the connector 102 of the storage device 100 may be inserted into a connector 1100 of the tray 1000.

Notches 106 may exist on the printed circuit board 101. The notches 106 may fix the storage device 100 inside the tray 1000.

The tray 1000 may include protrusion parts 1200 at positions corresponding to the notches 106 of the storage device 100. The protrusion parts 1200 may combine with the notches 106 to fix the storage device 100.

Switches 160_1 and 160_2 of the detection circuit 160 may be provided inside the notches 106. When the notches 106 combine with the protrusion parts 1200, the switches 160_1 and 160_2 of the detection circuit 160 may be pressed. When the switches 160_1 and 160_2 are pressed, the detection circuit 160 may deactivate the second signal S2.

The tray 1000 may include a latch 1300. The latch 1300 may help the storage device 100 be detached from the tray 1000. For example, when a user presses the latch 1300, the tray 1000 may push out the storage device 100. The tray 1000 may push out the storage device 100 to such an extent that the storage device 100 protrudes from the tray 1000 as compared with other storage devices while a power supply is maintained in the connector 1100. If the storage device 100 protrudes as compared with other storage devices, a user may easily detach the storage device 100 from the tray 1000.

Figure 13:
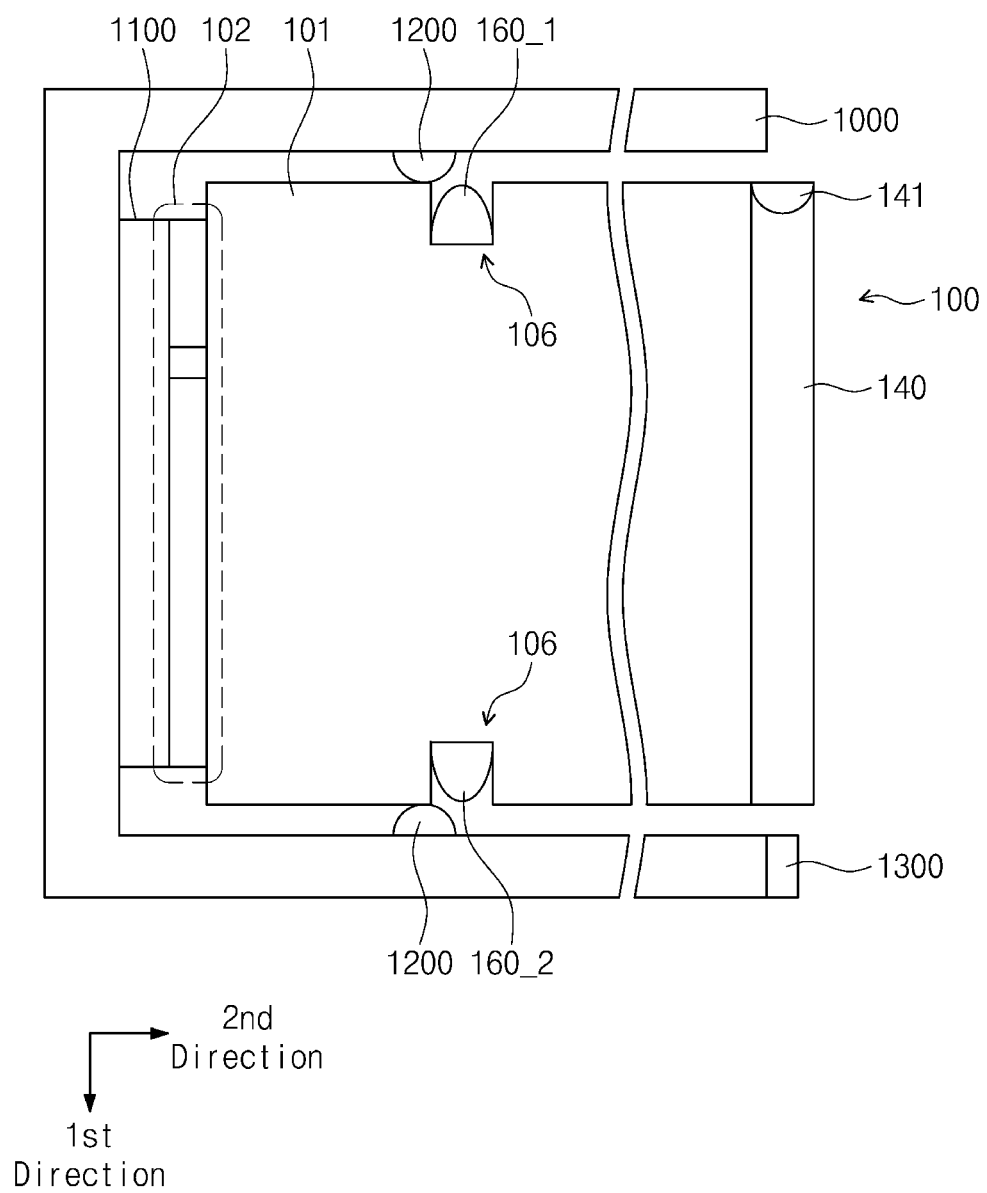
FIG. 13 illustrates an example where a storage device protrudes.

FIG. 13 illustrates an example where a storage device protrudes. Referring to FIGS. 1, 12, and 13, when the latch 1300 is pressed, the storage device 100 may protrude from the tray 1000. At this time, although the connector 102 of the storage device 100 is being moved away from the connector 1100 of the tray 1000, a connection between the connectors 102 and 1100 may be maintained to such an extent that power is still supplied between the connectors 102 and 1100.

As the storage device 100 protrudes, the notches 106 of the storage device 100 become dislodged from the protrusion parts 1200 of the tray 1000. As the locations of the notches 106 become different from the locations of the protrusion parts 1200 of the tray 1000, the switches 160_1 and 160_2 of the detection circuit 160 are no longer pressed. If the switches 160_1 and 160_2 are not pressed, the detection circuit 160 may activate the second signal S2.

The detection circuit 160 may detect whether the storage device 100 protrudes by detecting that the switches 160_1 and 160_2 are not pressed. If it is detected that the storage device 100 protrudes, the display device 140 may display the first color to notify that the storage device 100 is in the replacement selection state.

Figure 14:
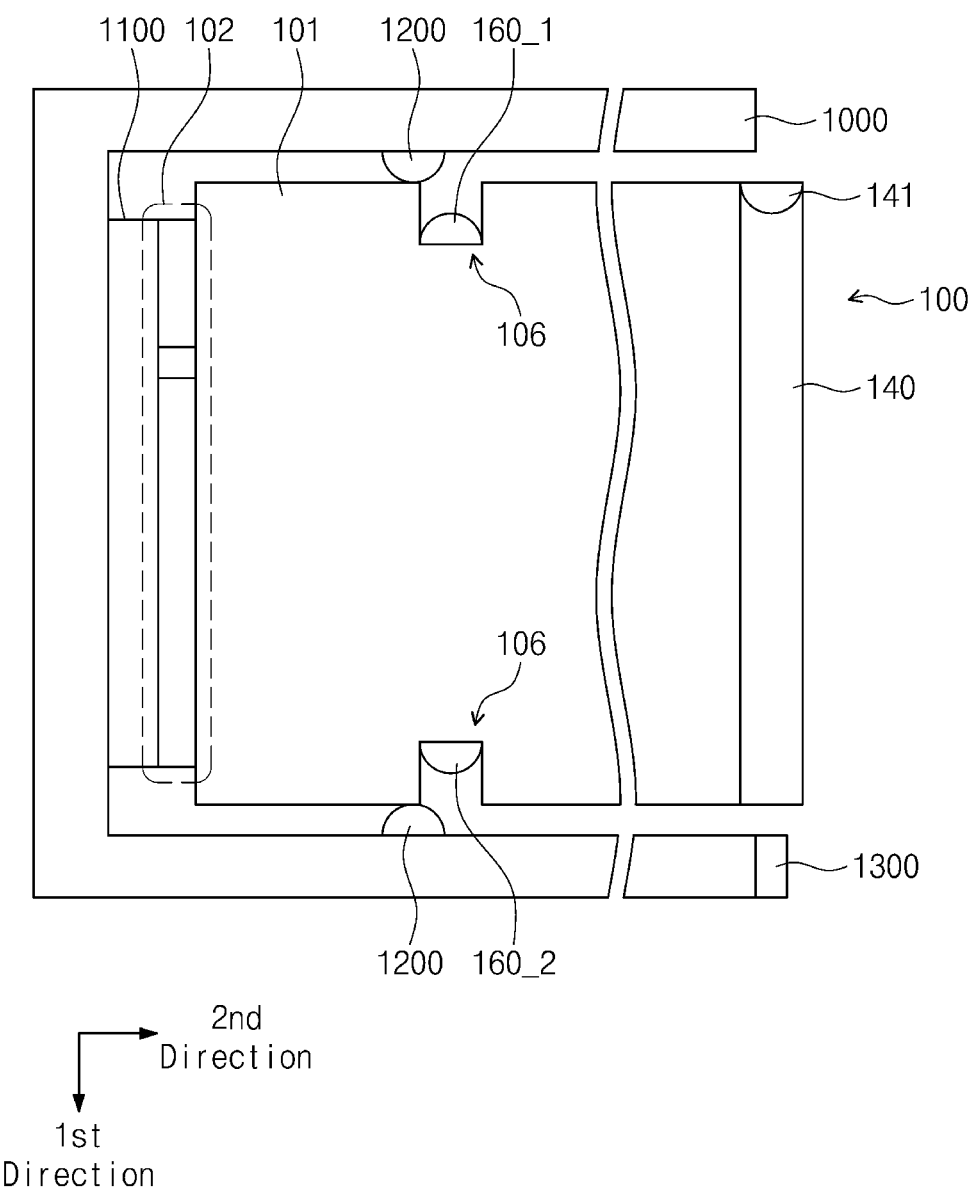
FIG. 14 illustrates another example where a storage device protrudes from the tray.

FIG. 14 illustrates another example where a storage device protrudes from the tray 1000. Referring to FIGS. 1, 12 and 14, when the latch 1300 is pressed, the storage device 100 may protrude from the tray 1000. Although the connector 102 of the storage device 100 is moved away from the connector 1100 of the tray 1000, a connection between the connectors 102 and 1100 may be maintained to such an extent that power is supplied between the connectors 102 and 1100.

In FIGS. 12 and 14, the switches 160_1 and 160_2 may detect an electrical connection and an electrical disconnection instead of detecting a physical pressure. When the storage device 100 is inserted, the protrusion parts 1200 may contact the switches 160_1 and 160_2. The protrusion parts 1200 may include conductive material and a specific voltage (e.g., a ground voltage or a power supply voltage) may be applied to the protrusion parts 1200. The switches 160_1 and 160_2 may include a conductive material. The detection circuit may detect whether a specific voltage is applied from the protrusion parts 1200 through the switches 160_1 and 160_2. If the specific voltage is applied, the detection circuit 160 may deactivate the second signal S2.

As described in FIG. 14, if the storage device 100 protrudes (e.g., detached from the tray 1000), the protrusion parts 1200 may be electrically separated from the switches 160_1 and 160_2. When the specific voltage is not applied to the switches 160_1 and 160_2, the detection circuit 160 may activate the second signal S2.

Figure 15:
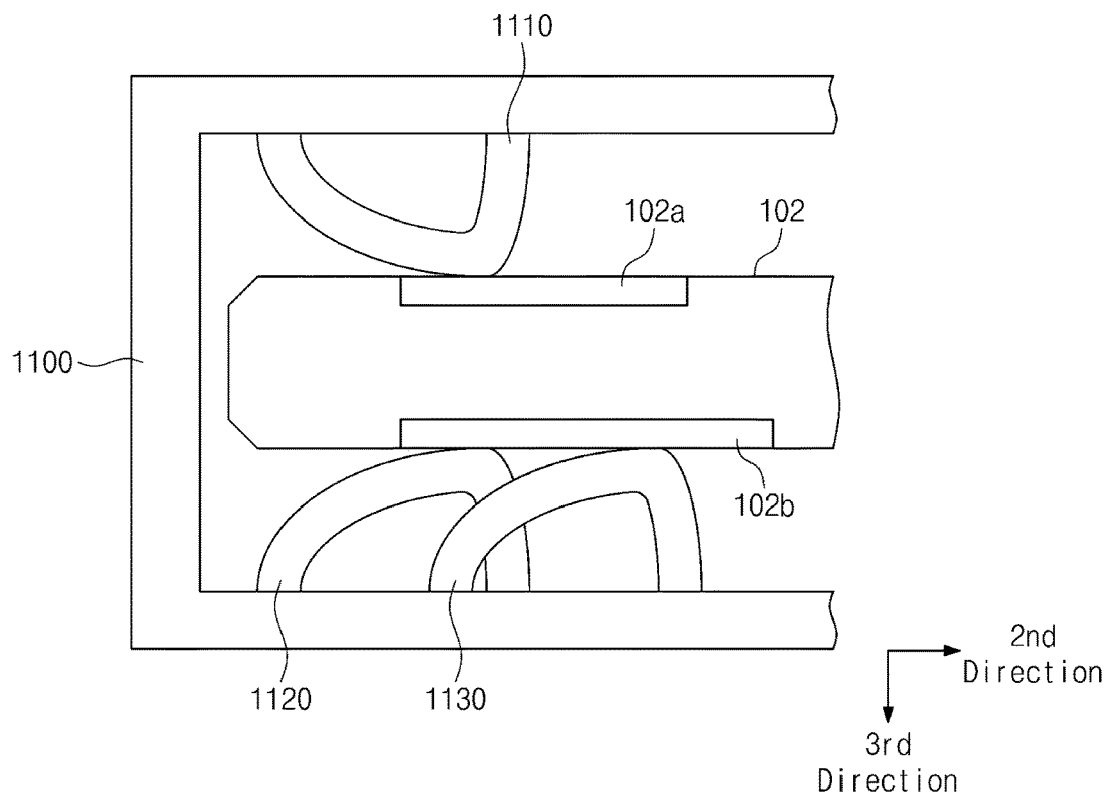
FIG. 15 illustrates another example where connectors are connected to one another.

FIG. 15 illustrates another example where connectors 102 and 1100 are connected to one another. Referring to FIGS. 1 and 15, the connector 102 may include a plurality of connection terminals disposed on its top surface and its bottom surface. In FIG. 15, one connection terminal 102a is illustrated on the top surface of the connector 102 and another connection terminal 102b is disposed on the bottom surface of the connector 102.

The connector 1100 includes top surface pins 1110, first bottom surface pins 1120, and second bottom surface pins 1130 that are connected to the connection terminals of the connector 102. Each of the top surface pins 1110 may correspond to each of the connection terminals of the top surface of the connector 102. Each of the first and second bottom surface pins 1120 and 1130 may correspond to each of the connection terminals of the bottom surface of the connector 102.

The first bottom surface pins 1120 and the top surface pins 1110 may be disposed at the same location along the second direction. The second bottom surface pins 1130 may be disposed further toward the second direction as compared with the top surface pins 1110 and the first bottom surface pins 1120.

Figure 16:
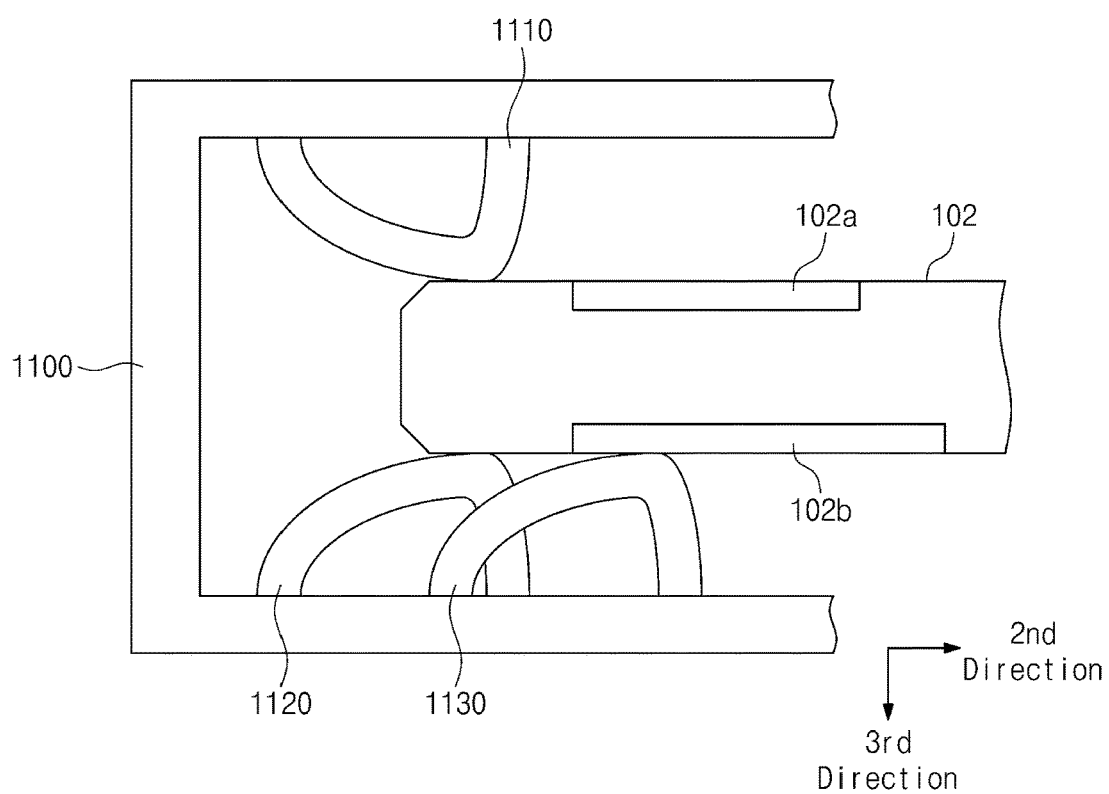
FIG. 16 illustrates an example where a storage device protrudes.

FIG. 16 illustrates an example where a storage device 100 protrudes from the tray 1000. Referring to FIGS. 1, 15 and 16, when the storage device 100 protrudes (e.g., when the storage device 100 is dislodged from or at least partially detached from the tray 1000), the top surface pins 1110 and the first bottom surface pins 1120 may be detached from the connection terminals of the connector 102. The second bottom surface pins 1130 may maintain a state where the second bottom surface pins 1130 are connected to the connection terminals of the connector 102. The second bottom surface pins 1130 may include at least one pin that supplies power to the storage device 100. Thus, the storage device 100 may be in the replacement state.

The storage device 100 may receive power through the second bottom surface pins 1130. The detection circuit 160 may detect whether at least one of the connection terminals corresponding to the top surface pins 1110 and the first bottom surface pins 1120 is connected to or detached from a corresponding connection terminal. When one of the connection terminals is connected to the corresponding pin (refer to FIG. 15), the detection circuit 160 may deactivate the second signal S2. When the connection terminals are detached from the corresponding pins (refer to FIG. 16), the detection circuit 160 may activate the second signal S2.

Figure 17:
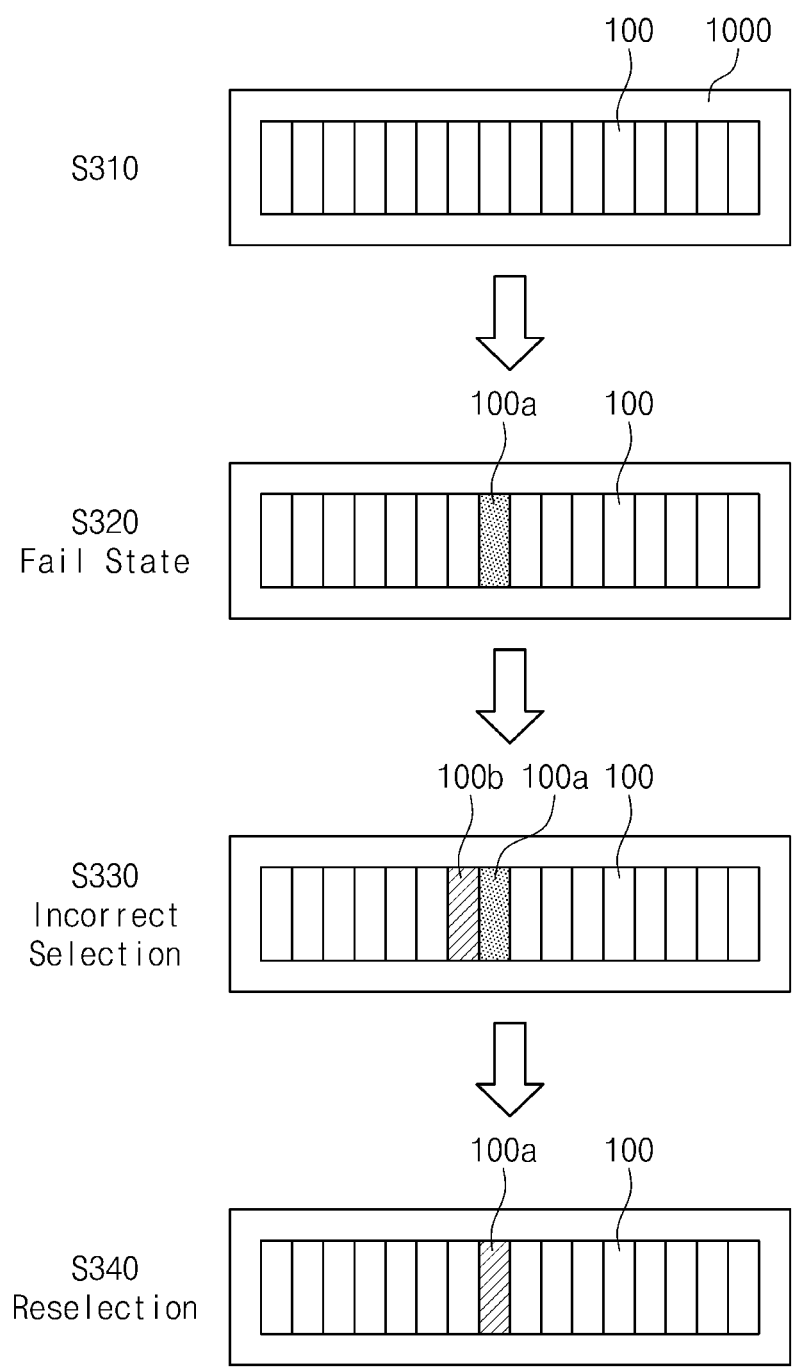
FIG. 17 illustrates an example where storage devices in a tray display a color through display devices.

FIG. 17 illustrates an example where storage devices 100 in a tray 1000 display a color through display devices. Referring to FIGS. 1 and 17, in an operation S310, the storage device 100 may be in a normal state. The normal state may include a standby state or an access state.

In an operation S320, a specific storage device 100a may enter a fail state. In the fail state, the storage device 100a may display a color corresponding to the fail state, as indicated by a shaded region in FIG. 17.

In an operation S330, a user adjusts a lever or a latch to replace the storage device 100a in fail state but may perform an incorrect selection. For example, as a size of the storage devices 100 is reduced, a size of a corresponding lever or latch may also be reduced. As a size of the corresponding lever or latch is reduced, when a user handles a lever or a latch, an incorrect selection may occur. For example, it is assumed that a storage device 100b adjacent to the specific storage device 100a is selected by a user. As the adjacent storage device 100b enters the replacement state, the adjacent storage device 100b may display a color corresponding to the replacement state as indicated by a hashed region in FIG. 17.

When an incorrect selection occurs, a color corresponding to the fail state of the specific storage device 100a is not changed and a color of the adjacent storage device 100b is changed into a color corresponding to the replacement state. Thus, a user may easily recognize that an incorrect selection has been made.

In an operation S340, a reselection may be performed by a user. For example, the user may handle a lever or a latch corresponding to the specific storage device 100a. As a correct selection occurs, the specific storage device 100a changes from a color corresponding to the fail state into a color corresponding to the replacement color. By changing the color, it may be easily determined whether the correct storage device 100a in the fail state has been selected.

Figure 18:
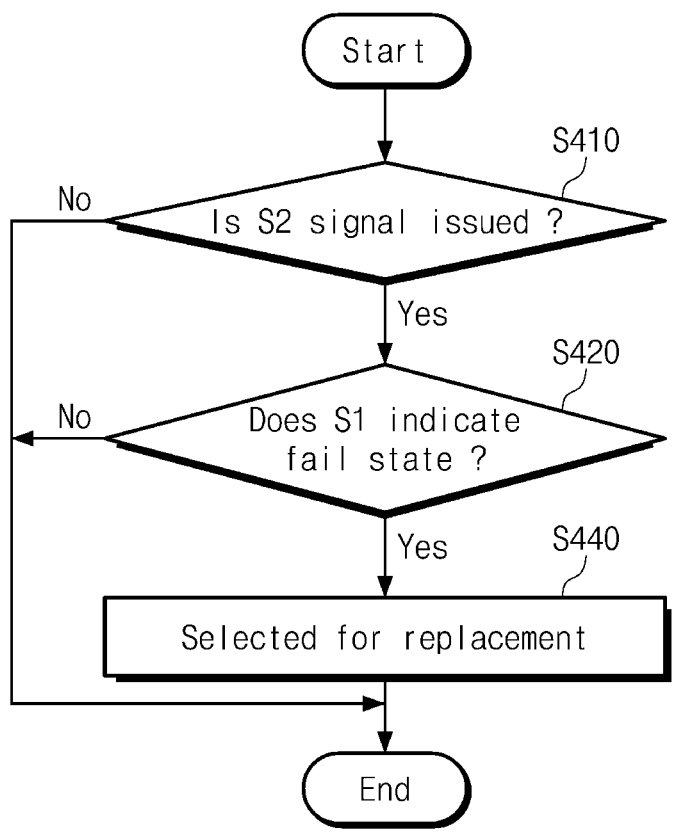
FIG. 18 illustrates another example where a display controller determines a replacement state.

FIG. 18 illustrates another example where a display controller 150 determines a replacement state. Referring to FIGS. 1 and 18, in an operation S410, the display controller 150 determines whether the second signal S2 is issued (or activated). If the second signal S2 is issued (activated), in an operation S420, the display controller 150 determines whether the first signal S1 indicates a fail state.

If the second signal S2 is issued (activated) and the first signal S1 indicates the fail state, in an operation S440, the second signal S2 may determine that the storage device 100 is in the replacement state. If the second signal S2 is not issued (or activated) or if the second signal S2 is issued (or activated) but the first signal S1 does not indicate the fail state, the display controller 150 may determine that the storage device 100 is not in the replacement state.

Figure 19:
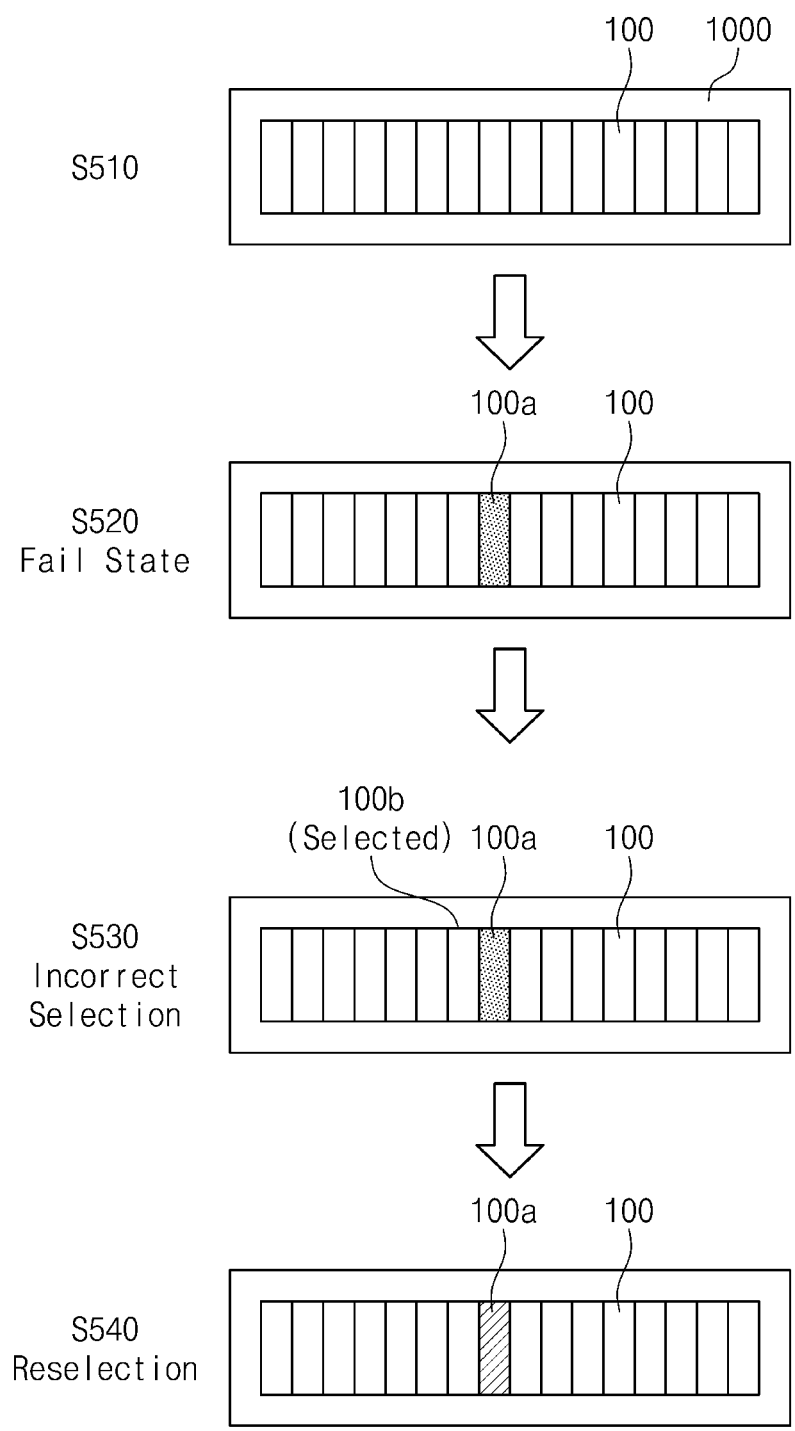
FIG. 19 illustrates an example where storage devices in a tray display a color through display devices according to a method of FIG. 18.

FIG. 19 illustrates an example where storage devices 100 in a tray 1000 display a color through display devices according to a method of FIG. 18. Referring to FIGS. 1 and 19, in an operation S510, the storage device 100 may be in a normal state. The normal state may include a standby state and an access state.

In an operation S520, a specific storage device 100a may enter a fail state. In the fail state, the storage device 100a may display a color corresponding to the fail state, as indicated by a shaded region in FIG. 19.

In an operation S530, a user adjusts a lever or a latch to replace the storage device 100a having the fail state but may perform an incorrect selection. For example, as a size of the storage devices 100 is reduced, a size of a corresponding lever or latch may also be reduced. As a size of the corresponding lever or latch is reduced, when a user handles a lever or a latch, an incorrect selection may occur. For example, it is assumed that a storage device 100b adjacent to the specific storage device 100a is selected by a user.

If the adjacent storage device 100b is selected by a user, the second signal S2 may be activated in the adjacent storage device 100b. However, since the first signal S1 of the adjacent storage device 100b does not indicate the fail state, the adjacent storage device 100b may not display a color of the replacement state but may maintain a color of the normal state.

When an incorrect selection occurs, a color corresponding to the fail state of the specific storage device 100a is not changed. Thus, a user may easily recognize that an incorrect selection has been made.

In an operation S540, a reselection may be performed by a user. For example, the user may handle a lever or a latch corresponding to the specific storage device 100a. As a correct selection occurs, the second signal S2 of the specific storage device 100a may be activated. Thus, the specific storage device 100a changes from a color corresponding to the fail state into a color corresponding to the replacement color. By changing the color, it may be easily identified whether the correct storage device 100a in the fail state has been selected.

A storage device according to example embodiments may change a color of a display device according to a state change and in particular, when being selected for replacement the storage device may change a color of the display device. An incorrect selection of a storage device for replacement may be thereby avoided when the storage device is used in a server.

The descriptions above pertain to various exemplary embodiments of the present disclosure. The disclosure may also include other embodiments.

What is claimed is:

1. A storage device comprising:
    nonvolatile memory devices;
    a controller configured to control the nonvolatile memory devices;
    a display device;
    a detection circuit; and
    a display controller configured to control the display device, wherein the display controller is further configured to control the display device to display different colors respectively corresponding to states of the storage device, the states comprising an access state in which the controller accesses the nonvolatile memory devices according to a request from an external host device, a standby state in which the controller is ready to perform the request from the external host device, a device fail state in which the controller and the nonvolatile memory devices cannot operate, and a replacement state in which the controller and the nonvolatile memory devices are selected for replacement,
    wherein the display controller is further configured to determine that the storage device is in the replacement state in response to a signal from the detection circuit being activated, and
    wherein the detection circuit is configured to activate the signal in response to a physical force not being applied to the detection circuit, and deactivate the signal in response to the physical force being applied to the detection circuit.

2. The storage device of claim 1, wherein the display device comprises:

a bottom surface having a first side along a first direction and a second side along a second direction, the second side being shorter than the first side; and a light emitting diode disposed at one side of the bottom surface along the first direction.

3. The storage device of claim 2, wherein the bottom surface reflects light irradiated from the light emitting diode.

4. The storage device of claim 2, wherein the display device further comprises at least one sidewall along a direction perpendicular to the bottom surface at one or more edges among four edges of the bottom surface.

5. The storage device of claim 4, wherein the at least one sidewall reflects light irradiated from the light emitting diode.

6. The storage device of claim 4, wherein the display device further comprises a cover disposed on the at least one sidewall and the light emitting diode, the cover being in parallel with the bottom surface.

7. The storage device of claim 6, wherein at least part of light irradiated from the light emitting diode passes through the cover.

8. The storage device of claim 1, wherein the detection circuit is a mechanical detection circuit detecting a mechanical movement.

9. The storage device of claim 1, further comprising a lever configured to move according to a physical force applied to the lever,
wherein the detection circuit is configured to activate the signal in response to the lever being moved from a first position to a second position.

10. The storage device of claim 1, wherein the detection circuit is an electrical detection circuit detecting an electrical change.

11. The storage device of claim 1, wherein the detection circuit comprises an electrode, and
wherein the detection circuit is configured to activate the signal according to whether the electrode contacts an external electrode.

12. A storage device comprising:
nonvolatile memory devices;
a controller configured to control the nonvolatile memory devices;
a display device;
a detection circuit; and
a display controller configured to control the display device,
wherein the display controller is further configured to control the display device to display different colors respectively corresponding to states of the storage device, the states comprising an access state in which the controller accesses the nonvolatile memory devices according to a request from an external host device, a standby state in which the controller is ready to perform the request from the external host device, a device fail state in which the controller and the nonvolatile memory devices cannot operate, and a replacement state in which the controller and the nonvolatile memory devices are selected for replacement,
wherein the display controller is further configured to determine that the storage device is in the replacement state in response to a signal from the detection circuit being activated while the storage device is in the device fail state, and
wherein the display controller is further configured to maintain a previous state in response to the display controller being not in the device fail state and the signal being activated.

13. The storage device of claim 12, wherein the display controller is further configured to determine that the storage device is in the replacement state in response to the display controller being not in the device fail state and the signal being activated.

14. A storage device comprising:
nonvolatile memory devices;
a controller configured to control the nonvolatile memory devices;
a detection circuit configured to activate a signal in response to an external adjustment on the storage device;
a display device; and
a display controller configured to control the display device,
wherein the display controller is further configured to change a color of the display device in response to the nonvolatile memory devices and the controller being in a device fail state and the signal being activated, and
wherein the display controller is further configured not to change the color of the display device in response to nonvolatile memory devices and the controller not being in a device fail state and the signal being activated.

15. The storage device of claim 14, wherein the display controller is further configured to maintain the color of the display device in response to the display controller not being in the device fail state and the signal being activated.

16. The storage device of claim 14, wherein the display device is configured to display a single color at once.

* * * * *